United States Patent [19]
Tripodi et al.

[11] Patent Number: 5,164,876
[45] Date of Patent: Nov. 17, 1992

[54] STATIC TRIP DEVICE COMPRISING AN EARTH PROTECTION DESENSITIZATION SYSTEM

[75] Inventors: Paul Tripodi, Eybens; Alain Del Vecchio, Echirolles, both of France

[73] Assignee: Merlin Gerin, Meylan, France

[21] Appl. No.: 546,756

[22] Filed: Jul. 2, 1990

[30] Foreign Application Priority Data

Jul. 3, 1989 [FR] France ............................ 89 09017

[51] Int. Cl.$^5$ ............................................. H02H 3/08
[52] U.S. Cl. ............................................. 361/93; 361/94; 364/483
[58] Field of Search ............................ 361/93–97, 361/79, 86, 87; 364/483

[56] References Cited

U.S. PATENT DOCUMENTS

| | | | |
|---|---|---|---|
| 4,761,704 | 8/1988 | Fraisse et al. | 361/50 |
| 4,914,541 | 4/1990 | Tripodi et al. | 361/94 |
| 4,937,757 | 6/1990 | Dougherty | 364/492 |

FOREIGN PATENT DOCUMENTS

| | | |
|---|---|---|
| 0283358 | 9/1988 | European Pat. Off. . |
| 2123514 | 11/1971 | Fed. Rep. of Germany . |
| 1342687 | 9/1963 | France . |

*Primary Examiner*—Todd E. DeBoer
*Attorney, Agent, or Firm*—Parkhurst, Wendel & Rossi

[57] ABSTRACT

The differential tripping threshold of the trip device is a polynomial function of an order greater than or equal to two of the highest phase current flowing in the power system protected by the circuit breaker comprising the trip device.

6 Claims, 7 Drawing Sheets

STATIC TRIP DEVICE COMPRISING AN EARTH PROTECTION DESENSITIZATION SYSTEM

BACKGROUND OF THE INVENTION

The invention relates to a static trip device of a protective circuit breaker of an A.C. electrical power system made up of at least two conductors, trip device comprising detection means of the phase currents flowing in the power system conductors, detection means of the earth fault current flowing in the power system, an electronic processing unit to which the output signals from the detection means are applied and which performs an earth fault protection function by generating, with or without a time delay, a circuit breaker tripping order in the event of a preset differential tripping threshold being exceeded by the earth fault current.

Figure 1:
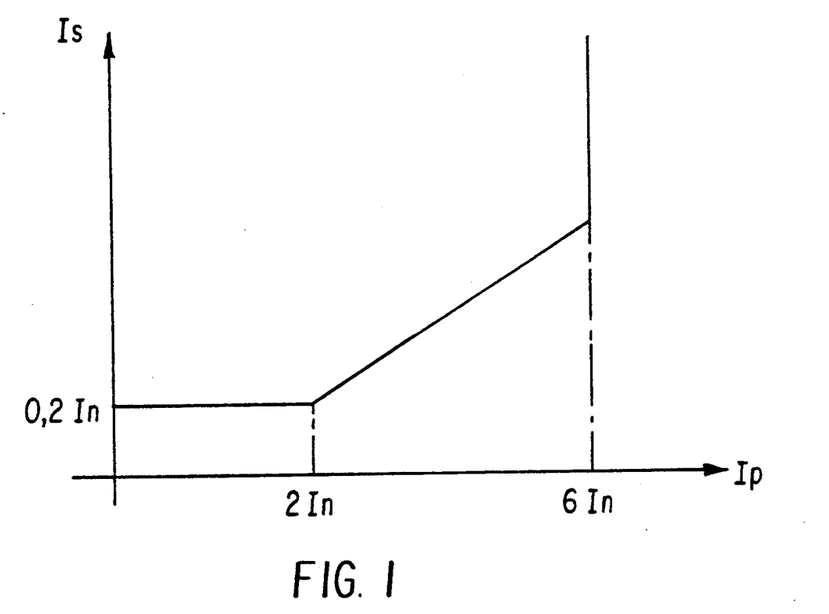
FIG. 1 represents the variation of the differential tripping threshold in terms of the phase current in a trip device according to the prior art.

When the phase currents in the power system are higher than a certain threshold, the vector sum of the currents present on the current transformer secondaries is not nil even in the absence of an earth fault. A signal, called false earth fault current, is then detected by the detection means of the earth fault current on which it is superposed. In order to avoid spurious circuit breaker trips, due not to an earth fault but to the existence of this false earth fault current, some known circuit breakers, performing an earth fault protection function, comprise an earth fault protection desensitization system. In being the rated current of the circuit breaker, state-of-the-art desensitization systems enable the earth fault tripping threshold to be raised when one of the phase currents exceeds a first preset value. As represented in FIG. 1, the earth fault tripping threshold Is is constant, for example equal to 0.2 In, when the phase current Ip is lower than 2 In, then this threshold Is increases linearly with the phase current when the latter is greater than 2 In. For very high phase current values, this desensitization is generally not sufficient, the false earth fault current then increasing very quickly, and it has been proposed to inhibit the earth fault protection when the phase current reaches a second preset value, for example 6 In as represented in FIG. 1. The values mentioned above are naturally given as an indication only.

SUMMARY OF THE INVENTION

The object of the invention is to achieve a trip device performing the earth fault protection function and insensitive to false earth fault currents.

According to the invention this aim is achieved by the fact that the differential tripping threshold Is is a polynomial function, of an order greater than or equal to two, of the highest phase current Ip flowing in the power system, i.e. a function of the type $Is = a + bIp + cIp^2 + dIp^3 \ldots$, in which the coefficients a, b, c, d are constants.

According to a preferred embodiment the function is of the type $Is = a + cIp^2 + dIp^3$.

The coefficients are determined in each case in terms of the type of circuit breaker so that, for any predetermined phase current Ip, the differential tripping threshold Is is always higher than the false earth fault current Ifh liable to be detected by the trip device.

The polynomial function may be used only above a certain phase current value, a preset fixed threshold, which can be adjusted by an operator, being able to be used as in state-of-the-art trip devices so long as the phase current is lower than this value.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DESCRIPTION OF THE PREFERRED EMBODIMENT

Figure 2:
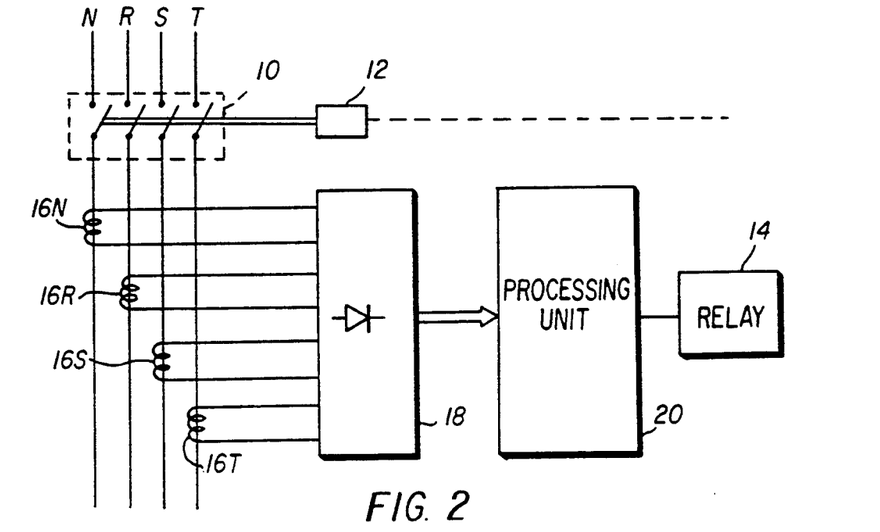
FIG. 2 represents a block diagram of a static trip device in which the invention can be implemented.

In FIG. 2, a circuit breaker 10 protecting the lines R, S, T and N of a three-phase plus neutral A.C. power system is actuated by an operating mechanism 12 controlled by a polarized relay 14 so as to order tripping of the circuit breaker in the event of an overload, short-circuit or earth fault.

The intensity of the current flowing in each line is detected by a current transformer 16R, 16S, 16T or 16N. The secondary windings of the current transformers are connected to a detector and rectifier circuit which supplies the electronic processing unit 20 of the trip device with signals representative of the phase, neutral and earth fault currents, and with a supply voltage in the case of a system-powered trip device. The electronic processing unit 20 performs, in a known manner, the long delay, short delay and instantaneous tripping functions so as to generate a circuit breaker tripping order when preset thresholds are exceeded. The tripping order thus produced is applied to the polarized relay 14 in order to actuate the circuit breaker.

Processing units of this kind are well-known in the art, whether they be of the analog type as in the U.S. Pat. No. 4,571,659 or of the microprocessor-based digital type as in the U.S. Pat. No. 4,710,845.

The electronic processing unit 20 also performs differential protection of the power system from an earth fault current measurement signal supplied to it by the circuit 18. If there is no insulation fault on the power system, the earth fault current is nil. The presence of an insulation fault between an active conductor R, S, T, N of the power system and ground or earth causes a residual, or earth fault current to be detected by the circuit 18. The processing unit 20 uses this earth fault current measurement signal to perform, in a known manner, instantaneous or delayed tripping of the circuit breaker when this measurement signal exceeds preset thresholds.

Figure 3:
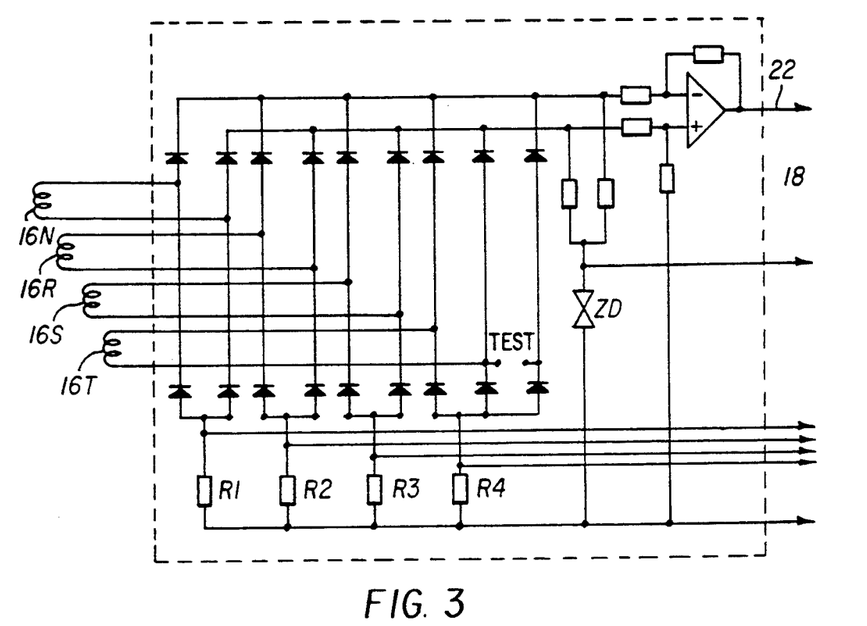
FIG. 3 represents a preferred embodiment of the detector and rectifier circuit of the trip device according to FIG. 2.

FIG. 3 represents in greater detail a particular embodiment of the detector and rectifier circuit 18 of the static trip device according to FIG. 2. This circuit, described in U.S. Pat. No. 4,899,246 supplies at the terminals of resistors R1 to R4 independent signals representative of the phase currents flowing in the conductors N, R, S and T and on a line 22 a signal representative of the earth fault current. The latter signal is obtained by making the difference between a signal representative of the sum of the positive half-waves of the output signals of the set of current sensors 16 and a signal representative, in absolute value, of the sum of the negative half-waves of these signals. The circuit 18 also supplies at the terminals of a Zener diode ZD a voltage to supply power to the trip device. The above-mentioned patent should be referred to for a more detailed explanation of the operation of this circuit.

According to the invention the differential tripping threshold Is with which the electronic processing unit 20 of the trip device compares the signal representative of the earth fault current, for example the signal present on the line 22 of the circuit 18 in FIG. 3, is a polynomial function, of an order greater than or equal to two, of the highest phase current Ip flowing in the power system.

Such a function is of the type $Is = a + bIp + cIp^2 + dIp^3 \ldots$, in which a, b, c, d are predetermined constant coefficients. Various functions of this type are represented in FIGS. 5 to 8.

Figure 4:
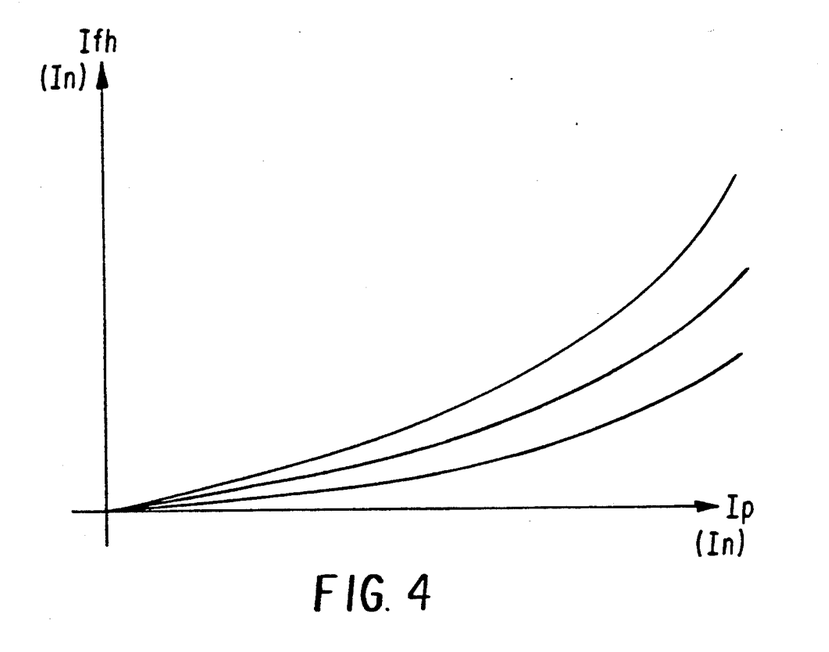
FIG. 4 presents curves obtained experimentally, representing the variation of the false earth fault current in terms of the phase current for circuit breakers of different ratings.
Figure 5:
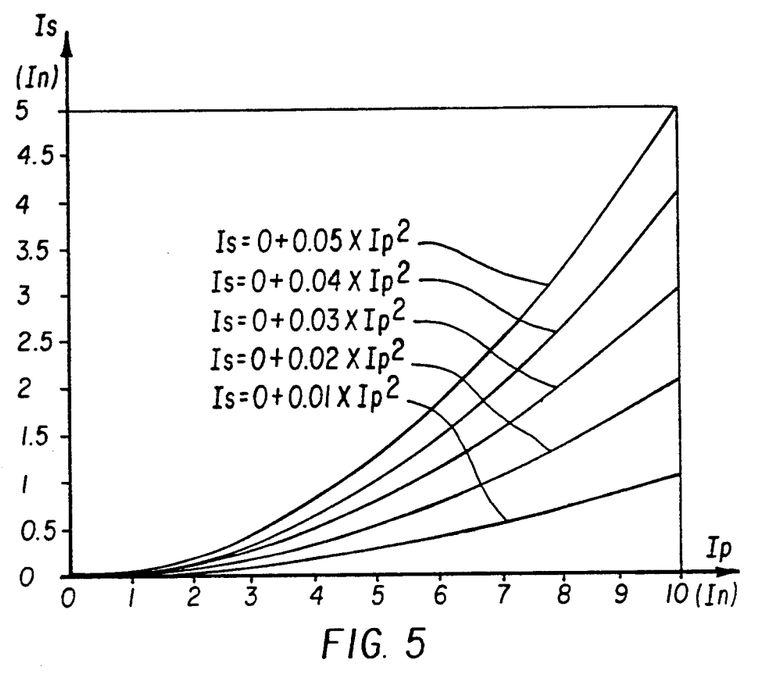
FIGS. 5 to 8 represent the variation of the differential tripping threshold in terms of the phase current for various values of the coefficients of the polynomial function according to the invention.
Figure 6:
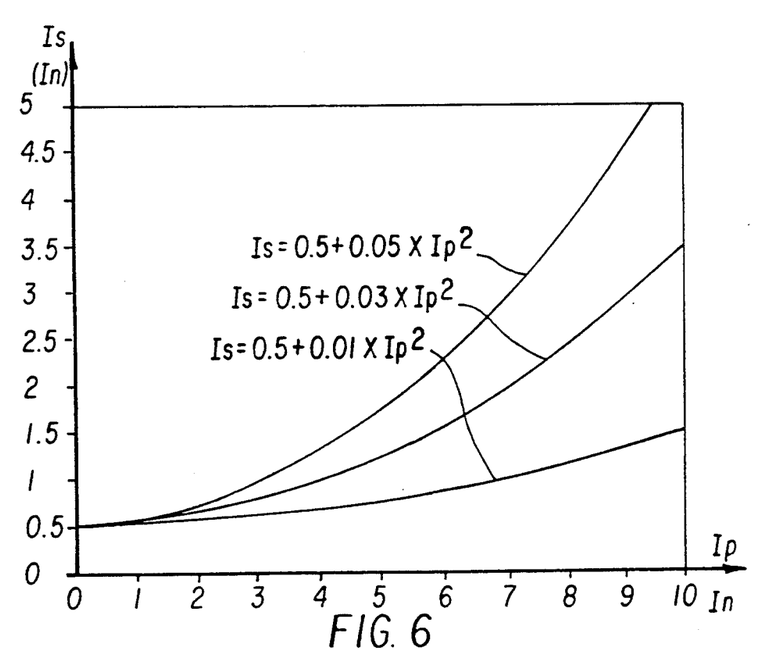
Figure 7:
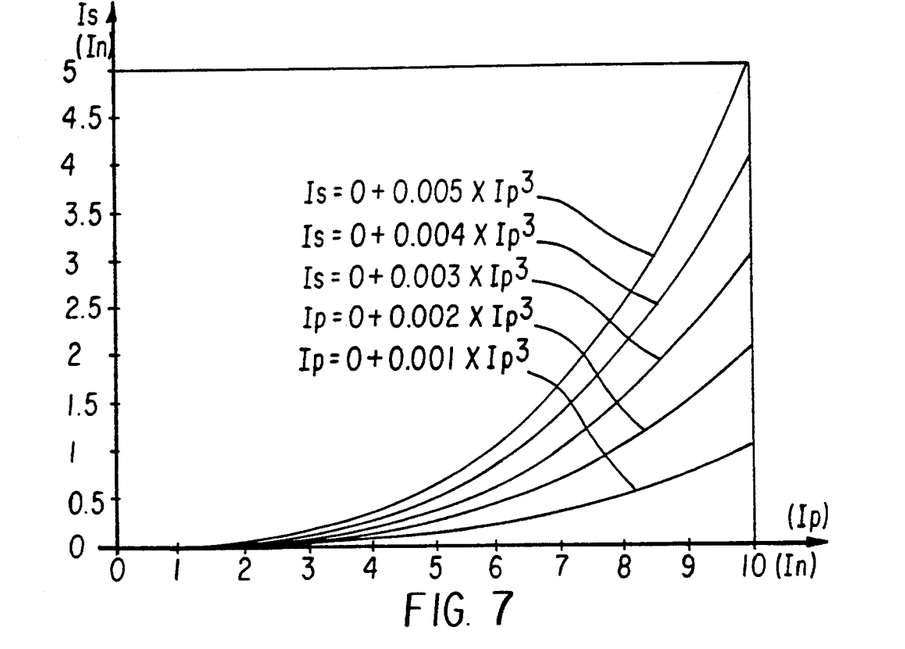
Figure 8:
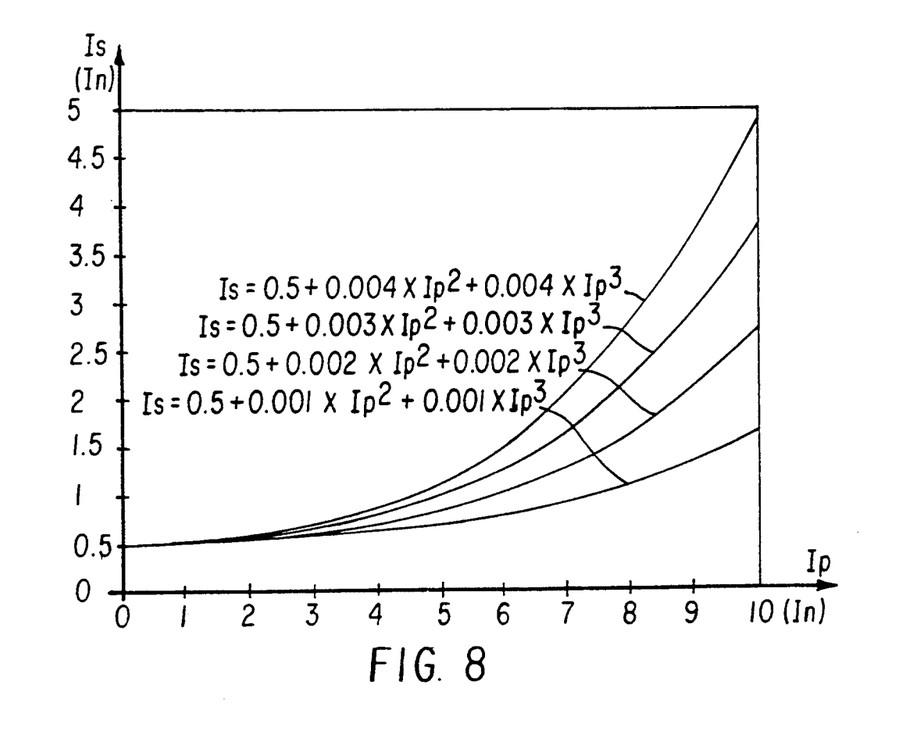
Figure 9:
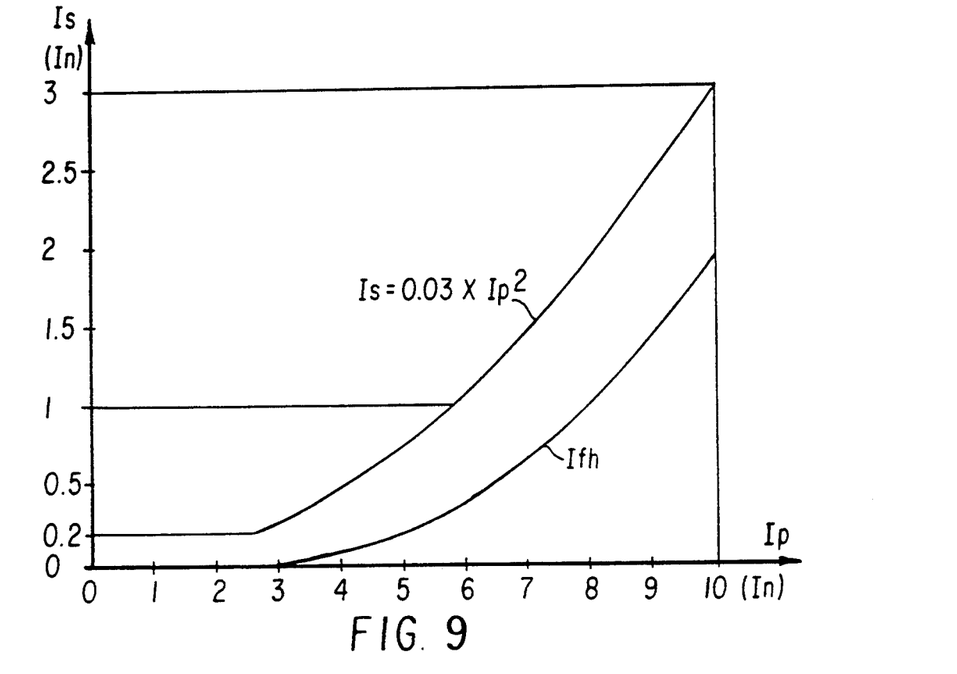
FIGS. 9 and 10 represent the variations of the differential tripping threshold and of the false earth fault current in terms of the phase current, in particular embodiments of the invention.
Figure 10:
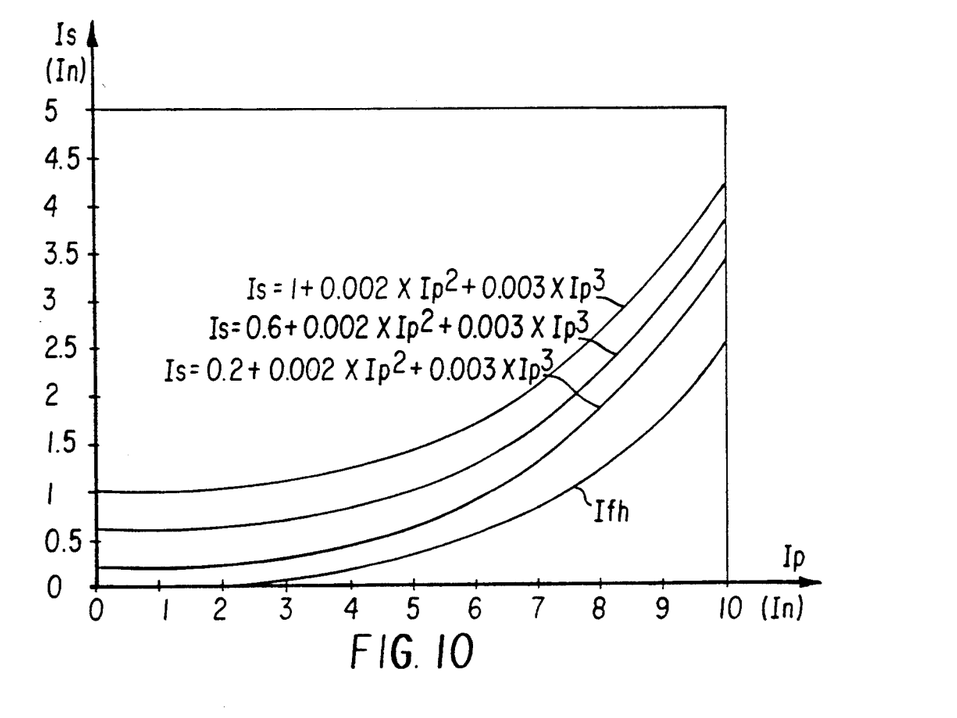

The choice of coefficients enables the differential tripping threshold desensitization curve to be adapted to the variation of the false earth fault current which depends on the type of circuit breaker used. Thus, for a given circuit breaker type, false earth fault current variation curves are drawn up experimentally in terms of the phase current, these curves (FIG. 4) depending notably on the type of current transformers used, the circuit breaker rating and the configuration of the circuit breaker poles. The coefficients of the polynomial function are then determined in such a way that, for a given phase current, the differential tripping threshold Is is always higher than the false earth fault current Ifh liable to be detected by the trip device (FIGS. 9 and 10).

In most cases a function of the type $Is = a + cIp^2$ or $Is = dIp^3$ (FIGS. 6 and 7) gives satisfactory results.

Processing of the earth fault signal can be performed either by an analog processing unit or by a microprocessor-based digital unit. In the latter case, the coefficients of the function can be modified very easily by programming. Automatic modification of the coefficients can notably be carried out when the circuit breaker rating is selected and a possibility also be provided for modification by an operator in terms of various parameters (rating, circuit breaker type, equipment configuration; entering parameters, FIG. 11).

The highest phase current Ip is, in the embodiment represented in FIGS. 2 and 3, determined by the processing unit 20, preferably of the microprocessor type. It can naturally also be determined in a conventional manner directly by the detector and rectifier circuit 18 which then supplies the unit 20 with a signal representative of the highest phase current and a signal representative of the earth fault current. The latter can be obtained not only in the manner represented in FIG. 3 but by any suitable means, in particular by rectification of the output signal of a summing transformer covering all the power system conductors.

The variation of the threshold Is being, according to the invention, relatively small for low values of the phase current Ip (see notably FIG. 7), the polynomial function can be used to determine the threshold Is for all the phase current values. In the embodiment represented in FIG. 10, the operator-adjustable constant coefficient a enables the minimum differential tripping threshold to be varied. According to an alternative embodiment, represented in FIG. 9, the threshold can be fixed, but adjustable (between 0.2 In and In in the figure) for the lower values of the phase current, the polynomial function ($Is = Ip^2 \times 0.03$ in the figure) only being used for the values of Ip greater than the corresponding value of the fixed threshold.

To adapt the desensitization curve to best suit the actual requirements of the circuit breaker, the number N of phases having a high current flowing in them can also be taken into account (FIG. 11) in determining the polynomial desensitization function coefficients. Indeed, the value of the false earth fault currents does not depend solely on the value of the highest phase current but also on the number of phases having a relatively high current flowing in them. A relatively small desensitization may thus be sufficient when, in a three-phase power system, two of the phase conductors have a current close to the rated current flowing in them, whereas the third has a higher current flowing in it. If, on the other hand, the three phase conductors have currents close to 5 to 6 In flowing in them, the desensitization, for the same highest phase current Ip, will have to be greater. If the processing unit does not take account of these differences, a desensitization curve corresponding to the least favorable case will naturally be chosen. It is however possible, notably when a microprocessor-based processing unit is used to which the signals representative of all the phase currents are applied independently (as in the embodiment according to FIGS. 2 and 3), to provide a sub-routine modifying the polynomial function coefficients according to the number N of phase currents greater than a certain preset (for example 5 In) threshold (S in FIG. 11). The desensitization can thus be adapted as accurately as possible to the differential tripping threshold.

Figure 11:
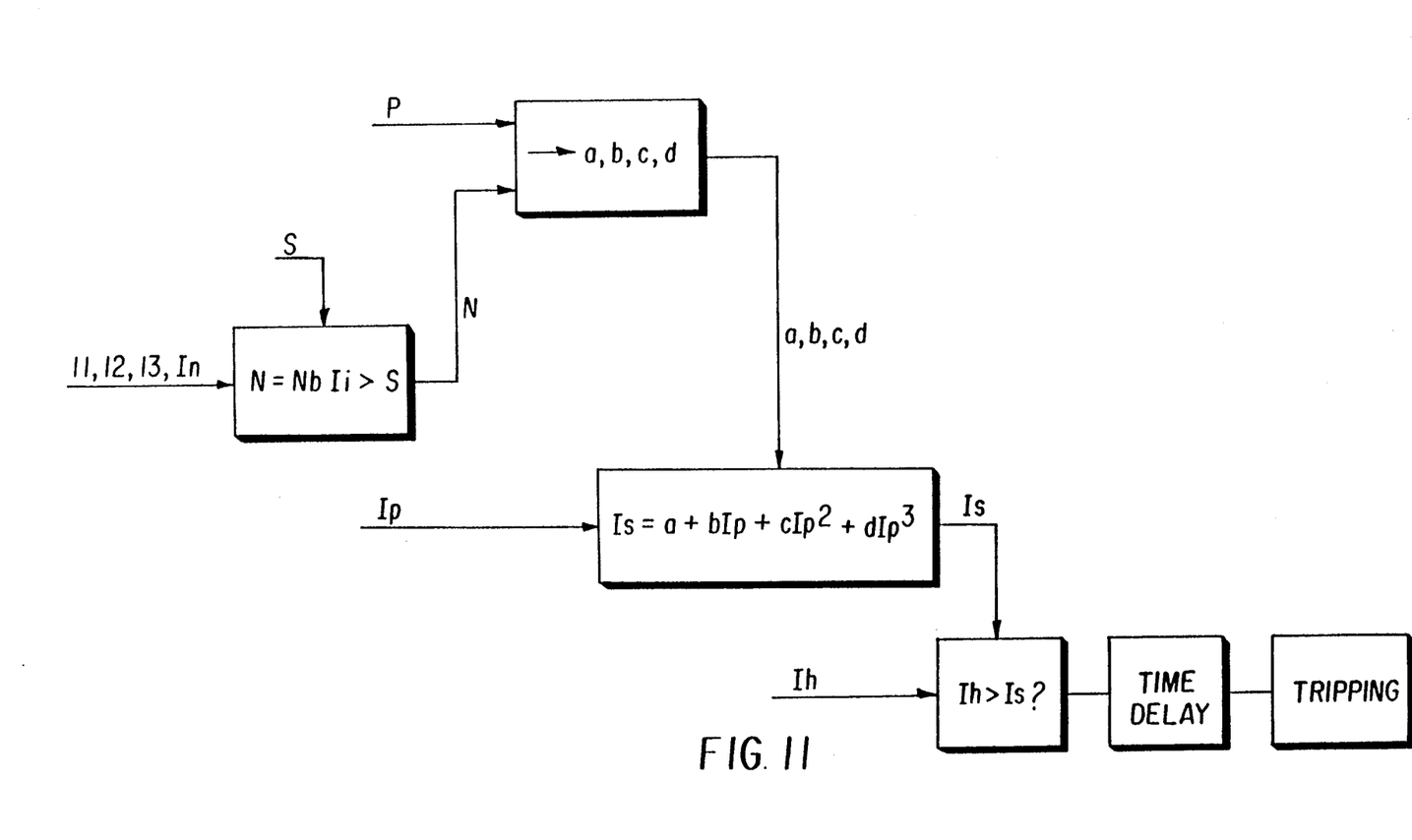
FIG. 11 schematically illustrates the relationships between the different parameters taken into account by the trip device to perform the earth fault protection function.

FIG. 11 represents the relationships between the different parameters taken into account by the trip device in the latter case. The number N of phase currents Ii (I1, I2, I3, In) greater than a threshold S is determined. The coefficients a, b, c and d are fixed taking account of this number N and of parameters P corresponding notably to the setting chosen by the operator (coefficient a), and to the circuit breaker rating and type. The threshold Is is computed from the highest phase current Ip and the earth fault current Ih is compared with the computed threshold Is, leading, after a time delay, to tripping of the circuit breaker if the threshold is exceeded.

Figure 12:
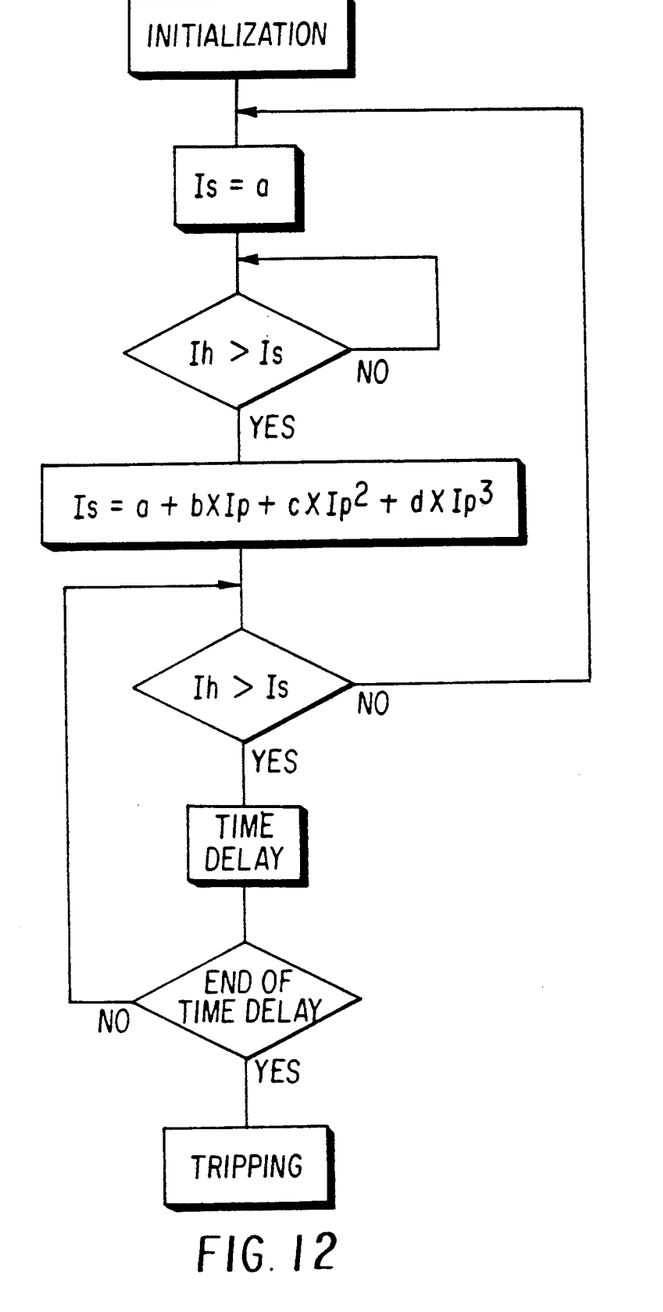
FIG. 12 represents a particular embodiment of a flow chart of the earth fault tripping function.

The flow chart in FIG. 12 illustrates a particular embodiment of the differential tripping function wherein, after initialization, the threshold Is is first of all set to the value of the coefficient a, and the earth fault current Ih is compared with this threshold. The polynomial function is only computed if the earth fault current is higher than this first threshold. The flow chart then proceeds conventionally by comparing the earth fault threshold with the new threshold Is and tripping after a time delay if the earth fault current is still at a value higher than this threshold.

We claim:

1. A static trip device of a protective circuit breaker of an A.C. electrical power system made up of at least two conductors, trip device comprising detection means of the phase currents flowing in the power system conductors, detection means of the earth fault current flowing in the power system, an electronic processing unit to which the output signals from the detection means are applied and which performs an earth fault protection function by generating, with or without a time delay, a circuit breaker tripping order in the event of a preset differential tripping threshold being exceeded by the earth fault current, trip device wherein the differential tripping threshold Is, is a polynomial function, of an order greater than or equal to two, of the highest phase current Ip, flowing in the power system, i.e. a function of the type $Is = a + bIp + cIp^2 + dIp^3 \ldots$, in which the coefficients a, b, c, d are constants.

2. The trip device according to claim 1, wherein said function is of the type $Is = a + cIp^2 + dIp^3$.

3. The trip device according to claim 1, wherein the coefficients are determined according to the type of circuit breaker so that, for any predetermined phase current, the differential tripping threshold is always higher than the false earth fault current liable to be detected by the trip device.

4. The trip device according to claim 3, wherein the coefficient a is adjustable by an operator.

5. The trip device according to claim 1, wherein the differential tripping threshold has a preset fixed value, adjustable by an operator, when the phase current is lower than a preset value and is equal to said function when the phase current is greater than said value.

6. The trip device according to claim 1, wherein the coefficients of the polynomial function are determined according to the number of phase currents higher than a preset threshold.

* * * * *